No. 794,940. PATENTED JULY 18, 1905.
A. T. JONES.
APPARATUS FOR PREPARING FOOD PRODUCTS.
APPLICATION FILED OCT. 22, 1900.
3 SHEETS—SHEET 2.
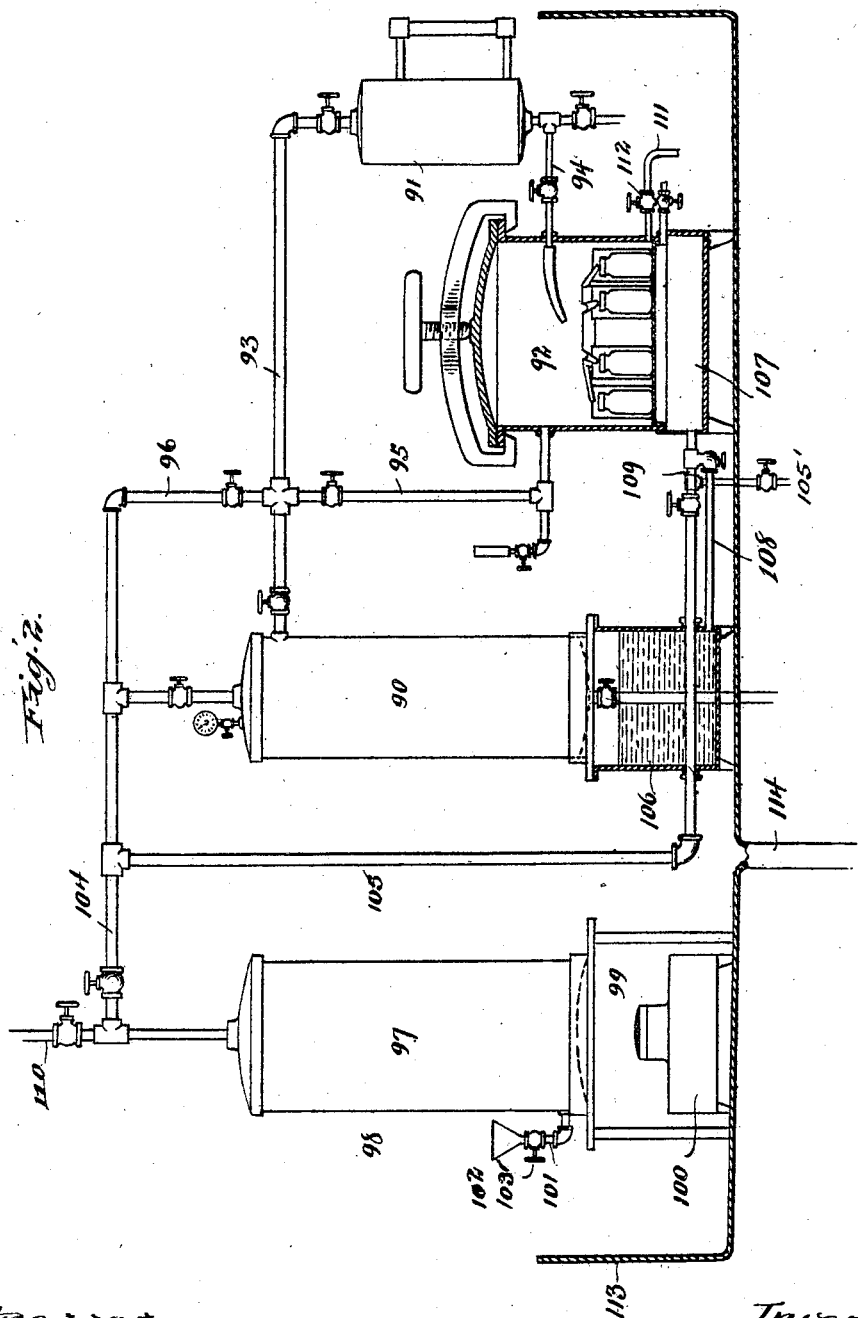

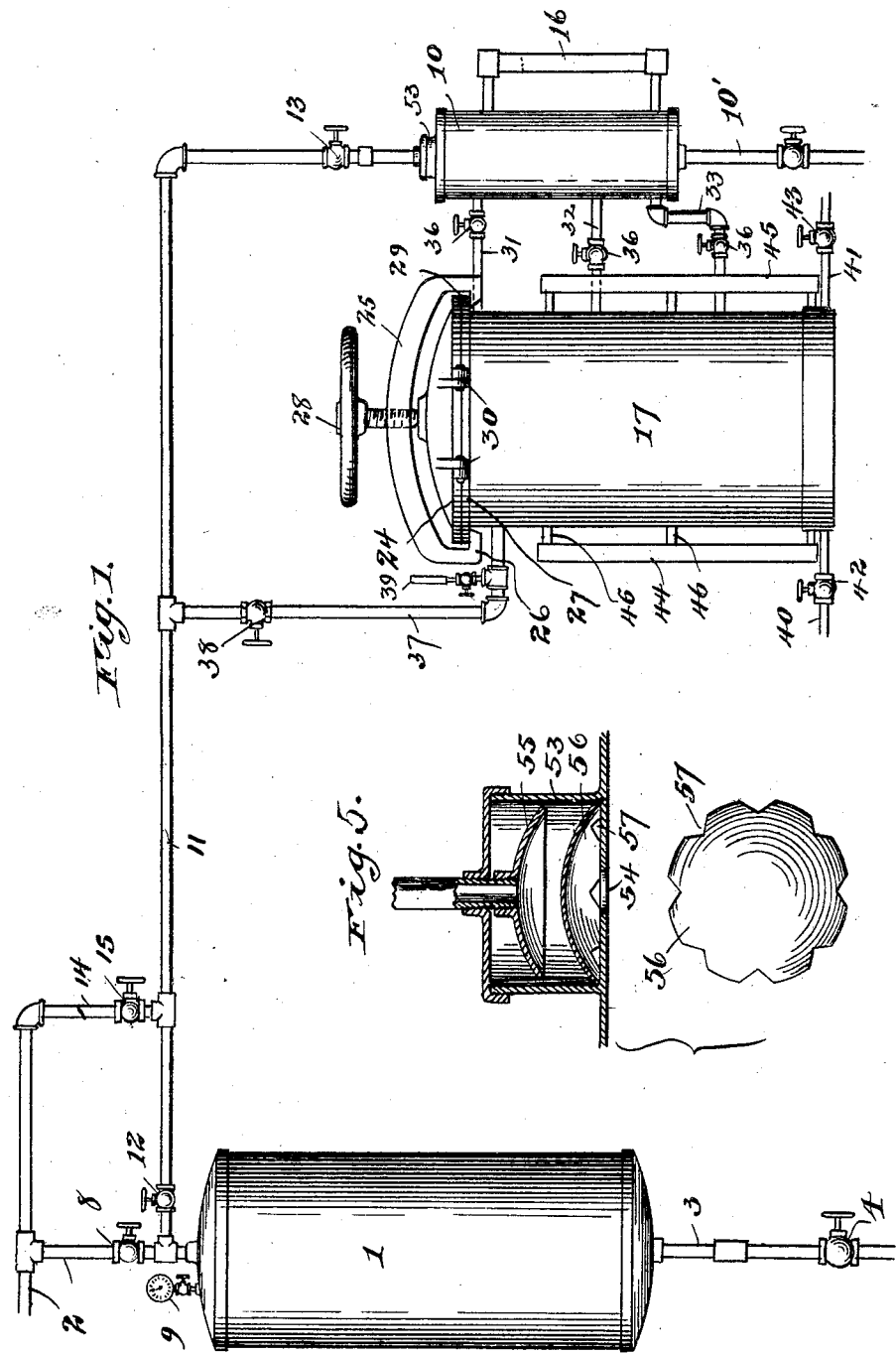

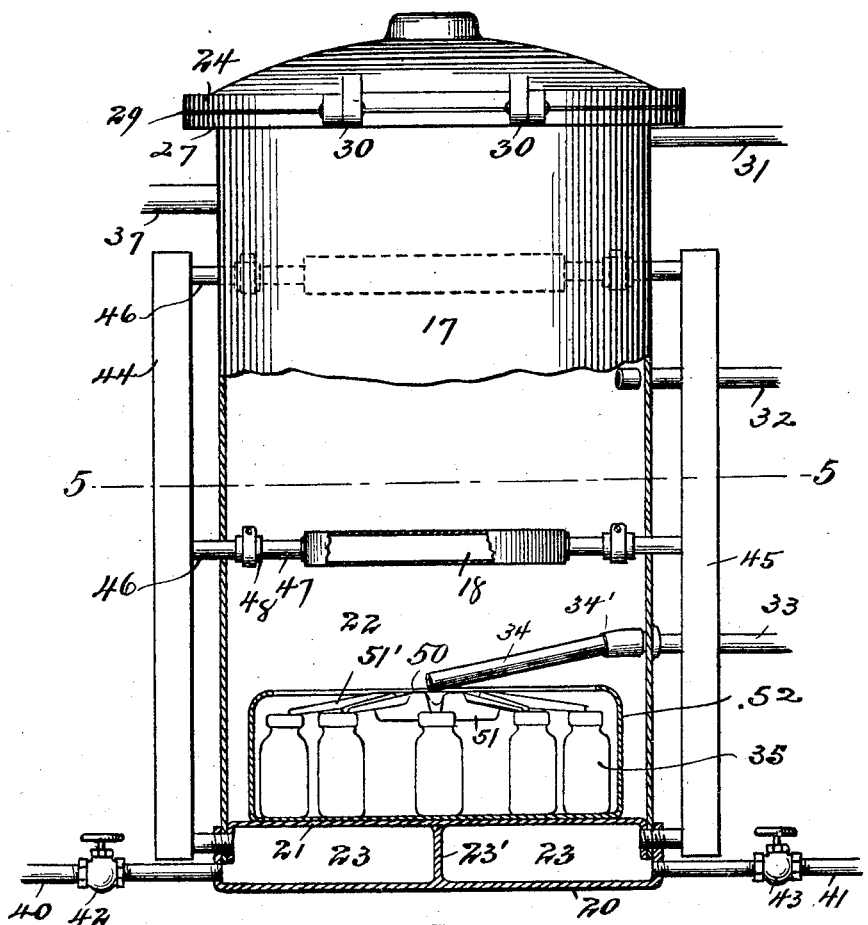
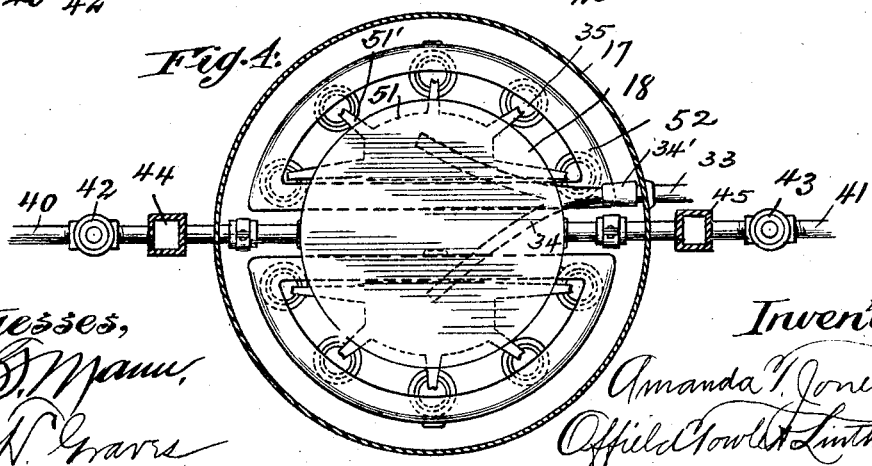

No. 794,940.

Patented July 18, 1905.

UNITED STATES PATENT OFFICE.

AMANDA T. JONES, OF JUNCTION CITY, KANSAS.

APPARATUS FOR PREPARING FOOD PRODUCTS.

SPECIFICATION forming part of Letters Patent No. 794,940, dated July 18, 1905.

Application filed October 22, 1900. Serial No. 33,916.

*To all whom it may concern:*

Be it known that I, AMANDA T. JONES, of Junction City, county of Geary, and State of Kansas, have invented certain new and useful Improvements in Apparatus for Preparing Food Products, of which the following is a specification.

This invention relates to an improved apparatus for preparing food products, and refers more specifically to apparatus for treating and sterilizing such food products either for future or immediate use.

Among the salient objects of the invention are to provide an improved apparatus for preparing food products whereby they are made ready for use or preservation by being subjected to treatment *in vacuo;* to provide an improved apparatus particularly adapted for carrying out a novel process made the subject of another application filed of even date herewith, but also adapted for other analogous uses, and in general to provide improvements in the details of construction and arrangement of the apparatus constituting the present invention.

The invention consists in the matters hereinafter described, and more particularly pointed out in the appended claims, and will be readily understood from the following description, reference being had to the accompanying drawings, forming a part of said description.

It is to be understood that my improved apparatus is adapted for use in preparing various kinds of food products, both of the animal and vegetable kingdoms, the end sought in carrying out the particular process set forth herein being to first devitalize or expel all gases and germs which would tend to spoil the product being treated and to then seal or inclose the product in such manner as to prevent the access of germs, thereby preparing the food so that it may be preserved indefinitely.

While the apparatus is described with reference to its use for treating food products, it is not to be thereby understood that its use is limited to such products; but it may, on the contrary, be otherwise employed.

Describing now said apparatus with reference to its accompanying drawings, Figure 1 is an elevation of a type of apparatus particularly adapted for carrying out the process on a relatively large scale. Fig. 2 shows a modified type of apparatus more particularly adapted for domestic purposes. Fig. 3 is an enlarged detail, in axial sectional view, of that one of the receptacles shown in the apparatus in Fig. 1, which I designate the "reservoir." Fig. 4 is a horizontal sectional view taken on line 5 5 of Fig. 3. Fig. 5 is an axial sectional view of a check-valve forming one feature of the apparatus shown in Fig. 1.

Referring first to Fig. 1, 1 designates as a whole a closed vessel, which for convenience of description I will hereinafter term an "exhauster," which is adapted to be charged with steam from any suitable source—as, for example, through an inlet-pipe 2, communicating with any suitable steam-boiler. The exhauster is provided with an outlet-pipe 3, controlled by a suitable valve, as 4. The inlet-pipe 2 is also controlled by a valve 8, and the exhauster is provided with a suitable vacuum-gage 9, whereby the degree of rarefication or vacuum within the exhauster will be indicated. 10 designates as a whole a second closed receptacle, which for convenience of description I will hereinafter designate the "tank," which is arranged to communicate with the exhauster through a pipe 11, said pipe being shown as conveniently arranged to form a branch of the inlet-pipe 2 of the exhauster and being provided with valves 12 13, whereby communication with the exhauster or tank may be controlled at will. The inlet or tank may be controlled at will. The inlet-pipe 2 is provided with a by-pass pipe or portion 14, controlled by a valve 15, whereby steam may be admitted to the tank while excluded from the exhauster or, vice versa, admitted to the exhauster while excluded from the tank. The tank is adapted to contain fluid which is added to the product, and it is therefore provided with a sight-gage 16, whereby the amount of fluid contained therein may be determined by inspection. 17 designates as a whole a third closed receptacle, which for convenience of description I will herein designate the "reservoir" and which is adapted to contain the product undergoing treatment, said vessel being shown in the present instance as consisting of an upright cylinder provided in its interior with a plurality of hollow shelves 18, arranged at different heights and pivotally supported upon pipe connections extending in through the side walls of the reservoir at diametrically opposite points and constituting parts of a circulating system whereby a heating medium may be passed through said hollow shelves in the manner and for the purpose hereinafter more fully described. The lower end of the reservoir is permanently closed by means of an end wall 20, and at a short distance above said end wall is arranged a partition or diaphragm 21, completely separating the upper from the lower portion of the receptacle and forming upper and lower chambers 22 23, respectively. Chamber 23 is preferably subdivided, as indicated at 23'. The upper end of the reservoir is formed by means of a removable closure or end wall 24, held in position so as to hermetically close the vessel and to withstand both internal and external pressure by means of a clamping-yoke 25, having its inturned ends 26 engaged with an overhanging flange 27 and supporting a hand-screw 28, threaded through its center and acting upon the outer surface of the inclosure, as indicated clearly in the drawings. In order to insure a perfectly-tight joint between the end margins of the reservoir and the removable end wall 24, a packing ring or washer 29 is interposed between said parts, and for convenience of manipulation the end wall is hinged to the body of the vessel, as indicated at 30.

31, 32, and 33 designate a series of pipes affording communication between the tank and the reservoir, these several pipes being arranged at different heights so as to severally discharge at points above the several series of product-receptacles 35, supported upon the several shelves 18 of the reservoir. Each of the pipes 31 32 33 is provided with a controlling-valve 36, and the end portions 34 of said pipes which project within the reservoir are made detachable by means of slip-joints 34', so that they may be removed in order to introduce and remove the product-receptacle conveniently. In addition to the liquid-pipes 31 to 33 a pipe 37 is arranged to form communication between the upper end of the keeper and the pipe 11, this pipe being provided with a controlling-valve 38 and desirably with a thermometer 39, whereby the temperature within the reservoir is indicated, it being understood that that portion of the pipe 37 with which the thermometer connects is in open communication with the interior of the reservoir. The lower chamber 23 of the reservoir, which for convenience I will hereinafter designate the "heating and cooling chamber," is provided with an inlet-pipe 40, through which either water or steam may be admitted to cool or heat said chamber, as may be required, and an outlet-pipe 41, both the inlet-pipe 40 and the outlet-pipe 41 being provided with suitable controlling-valves, as 42 43, respectively.

Describing now more particularly the circulating-pipe connections whereby water or other heating or cooling medium may be circulated through the hollow shelves 18, hereinbefore referred to, 44 45 designate risers communicating at their lower ends with the opposite sides of the lower chamber 23 and extending thence upwardly adjacent to the outer wall of the reservoir and each provided at points opposite the several shelves with inleading branches 46, which extend through the side walls of the reservoir and are connected with corresponding nipples 47, formed upon the hollow shelves by means of suitable unions 48, the joints thus formed being suitably packed to prevent leakage and being also so constructed and assembled that the shelves may be tilted upon their pivotal axes thus formed into vertical position. The shelves are held in horizontal position by means of frictional engagement with their supports or pipe connections upon the interior of the reservoir. The object of so mounting the hollow shelves 18 as to permit them to be moved into vertical position is to enable the receptacles containing the food products to be inserted and removed without removing the shelves.

50 designates a plurality of distributing-receptacles, for convenience of description hereinafter termed "distributers," two for each shelf, said distributers being provided with a plurality of open troughs or channels 51', severally leading to the respective receptacles constituting each set, and with a main channel 51, which is adapted to be brought into register with the inlet end of its respective supply-pipe leading in from the tank.

In order that the cans or other receptacles which contain the food product undergoing treatment may be submerged, as hereinafter described, each set of receptacles resting upon an individual shelf is inclosed in an outer surrounding receptacle or pan 52, which is provided with side walls rising some distance above the tops of the food-receptacles, so that the inclosing receptacle or pan may be filled with liquid to completely submerge the food-receptacles. Preferably, also, to facilitate the insertion and removal of food products the pan-shaped receptacles will be made semicircular and arranged in pairs upon each shelf.

It becomes necessary from time to time to admit liquid to the tank through the pipe 10' thereof, and it will be understood that if the liquid be thus admitted the partial vacuum obtaining within the system will cause the liquid to rise and tend to flow out through the communicating pipe 11 toward the exhauster. This tendency exists, however, only during the admission of the liquid and ceases as soon as the inlet-pipe is closed. In order to prevent the liquid from thus escaping from the tank, I provide a check-valve in the upper end thereof arranged to control the communicating pipe 11, said check-valve comprising a cylindric valve-chamber 53, forming an extension of the upper end of the tank and communicating with the latter through a port 54, the pipe 11 being arranged to communicate with the upper or opposite side of said chamber, as best indicated in Fig. 7. Upon the end of said pipe 11 which projects slightly within the top wall of the valve-chamber is mounted a fixed cup-shaped disk 55, apertured at its center to register with the aperture of the supporting-pipe, and below said disk 55 is loosely arranged a similar-shaped concavo-convex disk 56, imperforate at its center and adapted to fit within the fixed disk, so as to seal the end of the pipe 11 when raised by the upward rush of the fluid. The disk 56 is confined in position by means of the cylindric side walls of the valve-chamber, which hold it against lateral displacement, while permitting it to rise and fall a short distance, and in order to afford suitable passages for air or vapor past said valve-disk when in its lower or open position it is provided at its periphery with a plurality of notches or apertures 57.

In carrying out the process hereinbefore mentioned by the use of the apparatus thus far described I proceed as follows: Having arranged the several receptacles containing the product to be treated within the reservoir upon the several shelves, closed the reservoir securely, and supplied the tank with the fluid with which it is proposed to submerge the product-receptacles, before sealing the latter communication between the exhauster and the tank and reservoir is shut off by closing the controlling-valves 13 and 38 and steam admitted to the exhauster through pipe 11 to fill the latter. All of the communicating pipes of the exhauster are now closed, and the exhauster is drenched with cold water to condense the steam therein, thus creating a substantially perfect vacuum, after which the valves 13, controlling the tank, and a valve 38, controlling the reservoir, are opened, as well as the valve 12, thus permitting the exhausting action of the exhauster to partially exhaust the remainder of the apparatus. As soon as the pressure has become equalized between the several receptacles I again shut off communication between the exhauster and feeder and reservoir, open the valves to readmit steam to the exhauster, as before, then shut off the steam and condense, as in the first instance, and again open communication between the exhauster and other receptacles. I repeat these several steps until the vacuum-gage of the exhauster indicates that a comparatively perfect vacuum obtains throughout the system. After the requisite vacuum has been obtained, assuming that the product to be treated is of a character which readily gives up the air and gases contained therein, I apply heat to bring about the boiling by passing either water or steam through the lower chamber 23 of the reservoir and through the hollow supports or shelves upon which the food product is supported, which communicate with said chamber 23 through the risers, as hereinbefore described. It will be obvious that by reason of the arrangement of the communicating pipes and risers whatever heating medium is admitted to the lower chamber will rise and circulate through the hollow supports, so that the food-receptacles resting thereon will be warmed uniformly, the heating medium—as, for example, warm water—being permitted to flow out through the discharge-pipe 41 of the reservoir after having circulated therethrough. A very moderate degree of heat suffices to raise the food product to a boiling temperature *in vacuo*, this temperature being always less than 140° Fahrenheit, and the boiling acts to effectually liberate and discharge any air or gas which may have been retained within the product up to this stage of the process. After the boiling has been continued for a sufficient period of time to insure the complete discharge of the air and gases I then open the valve controlling the communicating pipe 31, extending between the tank and the reservoir and supplying the uppermost distributer, and permit the liquid to flow into the reservoir until the gage 16 indicates that sufficient liquid has been admitted to fill the food-receptacles and the receptacle or basket within which the latter are inclosed, so as to completely submerge the food-receptacles. It is obvious that previous to the warming of the food materials if any valve between tank and reservoir be opened the fluid contained in the former and which has been resting *in vacuo* subject to a gradual elimination of its contained air will flow downward by hydrostatic pressure or the stress of gravity and supply the food-receptacles with the amount required at this stage of the process; but after the warming of the materials *in vacuo*, they being partially submerged and with their surrounding fluid in a state of ebullition, the vacuum-space therefore practically pressureless will become faintly saturated with the ascending vapors, which will be drawn toward the exhauster, (the latter being open thereto,) but will not drift toward the tank. In this case the vacuum within the tank will remain undeteriorated and the fluid therein will refuse to flow downward, being withheld by the slightest accumulated pressure of vapor within the reservoir. In order to secure the downward flow of the fluid as desired and completely fill and submerge the food-receptacles as described, the valve communicating with the exhauster is closed, leaving tank and exhauster in full communication as to their vacuum-spaces. It is necessary to allow several minutes for the equalization of conditions between the two, the tank in the meantime acting in place of the exhauster and drawing vapor from the reservoir, after which the operation of the law of hydrostatic pressure or gravity which has been in suspense will again become operative and the fluid flow again freely and abundantly. In this connection it is to be noted that the liquid from the tank is permitted to flow in through the pipe 31 and distributer connected therewith slowly, and in thus trickling through the open passages exposed to the vacuum the liquid itself all becomes very thoroughly exhausted of any air or gases which may remain therein. Having thus filled the uppermost series of receptacles, I close the valve of the pipe 31 and proceed in precisely the same manner with the next succeeding lower set of receptacles, and so on until all of the product-receptacles have been flooded or submerged. The reservoir is now opened by removing its upper end closure and the several series of receptacles lifted out carefully, so as to not expose the mouths of the submerged product-receptacles and the stoppers or other sealing devices applied while the receptacle still remains submerged. In this way I absolutely prevent access of air and contaminating germs to the treated product, and when properly sealed the product will remain in perfect preservation indefinitely.

In carrying out the process of preparing products which are of a more or less viscous character or are otherwise of such character as to retard the discharge of the air and the gases therefrom under vacuum-pressure or in treating such food products as from their nature are liable to rapid deterioration I proceed as before until the required vacuum has been obtained in the apparatus, and then instead of immediately applying heat I first circulate through the hollow supports of the reservoir a cooling medium, such as cold water, thereby reducing the temperature to a point sufficiently low to prevent the development of germs, and I retain this low temperature long enough to permit the vacuum-pressure to act effectively in drawing out or extracting the air and gases. After this has been accomplished I apply the heat rapidly and conclude the process as before.

It will be understood, of course, that the process is also applicable to the treatment of products which are either fluid or semifluid in their nature, and in carrying out the process under such condition the several steps will be substantially the same as hereinbefore described, except that instead of placing the product in the receptacles within the reservoir in the first instance the product will be first placed in the tank and fed from the latter into the receptacles within the reservoir in precisely the same manner as is the liquid in the case of solid or semisolid products. It is to be noted in this connection that the vacuum obtaining within the apparatus exerts a strong evaporative effect upon the product, and by so regulating the flow of liquid or liquid product from the tank to the reservoir that the transfer takes place slowly I may evaporate, and therefore condense, to any reasonable extent found desirable, it being understood that the heat supplied in the meantime aids materially in producing this effect. It may also be explained that the hereinbefore-described process is adapted for preparing for keeping certain food products which do not require to be hermetically sealed after they have been treated. For example, certain meat products may be subjected to the vacuum treatment constituting the first part of the process, and the liquid which is added to such products during the latter part of the process may be of a character which will in itself impregnate and sufficiently effect the curing of the product to cause it to keep indefinitely without being hermetically sealed.

In Fig. 2 I have shown a modified form of the apparatus more particularly adapted for domestic purposes. In this instance 90 designates as a whole the exhauster, 91 the tank, and 92 the reservoir, these several members being interconnected, by means of pipes 93, 94, 95, and 96, in substantially the same manner as hereinbefore described in connection with Fig. 1. In the present instance, however, I have shown as a part of the apparatus a boiler 97, whereby the steam necessary for producing the vacuum may be generated and from which also the necessary heat for effecting the warming and boiling may be supplied. Describing said boiler more in detail, 98 designates the main body of the boiler, which in the present instance is an upright one, and 99 the furnace or fire-box beneath the boiler and within which is arranged any suitable heater—as, for example, an ordinary oil-burner 100. The boiler is provided with a suitable inlet-pipe 101, terminating at its outer end in a funnel 102, said filling-pipe 101 being arranged to extend vertically upward at its outer end portion and the funnel being mounted thereon so as to permit inspection of the interior of the vertical portion, so that the amount of water charged into the boiler may be determined. This inlet-pipe is also provided with a suitable controlling-valve 103. The boiler is connected with the exhauster through a pipe 104, which leads into the pipe 96, and therefore is also in communication with the rest of the apparatus. From the pipe 104 a branch pipe 105 leads to a water-chamber 106, formed beneath the exhauster 90, passing through this chamber in such manner as to be capable of imparting heat thereto, and extending from thence to and communicating with the lower chamber 107 of the keeper. A communicating pipe 108 connects the lower part of the water-chamber 106 with the said chamber 107 indirectly through the pipe 105, with which it connects and communicates at a point adjacent to the said chamber 107, as indicated at 109. Suitable valves are provided throughout the apparatus whereby the several members may be thrown into communication or isolated from each other at will, substantially as hereinbefore described in connection with Fig. 1. In the use of this apparatus the exhaust-pipe 110 of the boiler will be left open until the discharge of steam therefrom indicates that the boiler is steaming, whereupon this exhaust-pipe will be closed by means of its valves and the steam admitted to the exhauster, the subsequent steps of producing the vacuum in the reservoir and rest of the apparatus being the same as hereinbefore described. It will be noted that in the present instance but a single series of food-receptacles can be treated at once, this series of food-receptacles resting directly upon the bottom of the reservoir, so as to have the heat transmitted thereto directly from the heating medium within the lower chamber 107 thereof. By reason of the extension of the steam-pipe 105 through the water-reservoir 106 the liquid in the latter may obviously be warmed or heated directly from the steam-boiler and this warmed or heated water used to raise the temperature of the reservoir, or, if preferred, the steam may be admitted directly to the chamber 107 of the reservoir when it is desired to employ a higher temperature. In order that a circulation of the steam through the pipe 105 may be secured when it is not desired to pass the steam through the chamber 107, said steam-pipe is provided with an exhaust branch 105', provided with a suitable controlling-valve. In the present instance the reservoir is shown as provided with an auxiliary liquid-inlet 111, shown as consisting simply of an inlet-pipe having a downturned portion and controlled by a valve 112, said inlet-pipe being arranged to admit liquid to the lower part of the product-chamber, as shown clearly in the drawings. The object of this construction is to enable liquid to be supplied to the product-chamber when it is desired to treat the product therein to a vapor-bath or to supply moisture to compensate for that driven off during the vacuum process. It will be understood that the liquid may be introduced through the inlet-pipe 111 by simply immersing the lower end of the downturned pipe in a receptacle containing liquid, whereupon the liquid will be drawn into the chamber under the atmospheric pressure when the valve is opened and without the admission of air. The entire apparatus is shown as desirably inclosed in a pan or shallow receptacle 113, which may conveniently be provided with a drain-pipe 114.

I claim—

1. In an apparatus for subjecting food products to a preservative treatment, the combination of a combined steam generator and exhauster, a reservoir connected with said generator and exhauster, a tank having pipe connections with said reservoir and likewise having pipe connections with said exhauster, and valves controlling both of said pipe connections, for the purpose set forth.

2. In an apparatus for subjecting food products to a preservative treatment, the combination of a combined steam generator and exhauster, a reservoir, a tank, a product-receptacle within the reservoir, a fluid-chamber within said reservoir entirely separated from the food-chamber thereof, valve-controlled pipes affording communication between the exhauster and reservoir and between the exhauster and tank, a valve-controlled pipe affording communication between the tank and reservoir, and means for circulating fluid through the fluid-chamber of the reservoir, substantially as described.

3. In an apparatus for subjecting food products to a preservative treatment, the combination of an exhauster, a source of steam-supply communicating therewith, a reservoir, a valve-controlled conduit affording communication between the exhauster and reservoir, a metallic product-support within the reservoir, a fluid-chamber having a wall of extended area which is in contact with said bracket-support, a tank, a valve-controlled conduit affording communication between the tank and reservoir, and means for circulating a temperature-changing fluid through said fluid-chamber of the reservoir, substantially as described.

4. In an apparatus of the character described, the combination of an exhauster, a source of steam-supply communicating therewith, a tank, a valve-controlled conduit extending between the exhauster and tank, a reservoir, a valve-controlled conduit extending from the reservoir to and communicating with the conduit extending between the exhauster and tank, a plurality of valve-controlled conduits extending between the tank and reservoir, communicating with the latter at different heights and adapted to permit the transfer of liquid by gravity from the former to the latter, and means for supplying heat to the reservoir comprising a closed conduit extending therethrough and means for circulating a heating medium through said closed conduit, substantially as described.

5. In an apparatus of the character described, the combination of a closed vessel constituting a reservoir, provided with a hermetically-sealing removable closure, a completely-isolated chamber formed in the lower part of said reservoir, a plurality of closed shelf-like hollow supports arranged at intervals throughout the height of said reservoir, each provided with pipe connections extending out through the walls of the reservoir, at opposite sides thereof, risers connecting said several pipe connections with the said lower chamber of the reservoir, inlet and outlet pipes communicating with said lower chamber and an exhaust-pipe communicating with the interior of the upper chamber, substantially as described.

6. In an apparatus of the character described, the combination of a closed vessel constituting a reservoir, provided with a hermetically-sealing removable closure, a completely-isolated chamber formed in the lower part of said reservoir, a plurality of closed hollow supports arranged at intervals throughout the height of said reservoir, each provided with pipe connections upon which said hollow supports are movably mounted, extending out through the walls of the reservoir, at opposite sides thereof, risers connecting said several pipe connections with the said lower chamber of the reservoir, inlet and outlet pipes communicating with said lower chamber and an exhaust-pipe communicating with the interior of the upper chamber, substantially as described.

7. In an apparatus of the character described, the combination of a keeper provided with a product-support, a tank and a pipe affording communication between the tank and keeper and means for directing a supply of liquid admitted to the keeper from the tank into a plurality of receptacles mounted upon said product-support, comprising a shallow vessel provided with a plurality of distributing-troughs, substantially as described.

8. In an apparatus of the character described, the combination of the reservoir, the hollow product-support therein, and means for circulating a heating medium therethrough, a pan adapted to rest upon said product-support, a series of product-receptacles arranged within said pan, means for admitting liquid to submerge said product-receptacles and means for exhausting the reservoir, substantially as described.

9. In an apparatus of the character described, the combination of the reservoir provided with a plurality of hollow product-supports, arranged above each other, and pivotally mounted to oscillate upon axes extending transversely of the reservoir, the pans adapted to rest upon the several supports, and the reservoir provided with valve-controlled pipes extending from the tank to the reservoir and severally discharging above the several product-supports therein, the distributers arranged to convey liquid from the several tank-pipes to the product within said pans, means for circulating a heating medium through said hollow supports and means for exhausting the reservoir and tank of air, substantially as described.

AMANDA T. JONES.

Witnesses:
ALBERT H. GRAVES,
FREDERICK C. GOODWIN.